United States Patent [19]

van Amerongen

[11] Patent Number: 4,590,657
[45] Date of Patent: May 27, 1986

[54] METHOD OF CONSTRUCTING AN ASSEMBLY WITH A ROLLER BEARING TO AVOID FRETTING CORROSION

[75] Inventor: Evert van Amerongen, Bennekom, Netherlands

[73] Assignee: SKF Industrial Trading & Development Company B.V., Netherlands

[21] Appl. No.: 599,330

[22] Filed: Apr. 12, 1984

[30] Foreign Application Priority Data

May 13, 1983 [NL] Netherlands .......................... 8301723

[51] Int. Cl.⁴ ...................... B23P 9/00; B21D 53/12; B21K 1/05; F16C 27/00
[52] U.S. Cl. ............................ 29/458; 29/148.4 R; 29/148.4 L; 29/149.5 S; 29/434; 264/262; 384/492; 384/536; 384/582
[58] Field of Search .................. 29/148.4 R, 148.4 A, 29/148.4 C, 148.4 L, 148.4 S, 434, 458, 149.5 S; 264/261, 262; 384/492, 536, 582

[56] References Cited

U.S. PATENT DOCUMENTS

| | | | |
|---|---|---|---|
| 3,027,626 | 4/1962 | Murphy | 29/148.4 L |
| 3,360,312 | 12/1967 | De Wit et al. | 384/492 X |
| 3,528,712 | 9/1970 | Vacca et al. | 384/536 |
| 3,672,734 | 6/1972 | Bando | 384/536 |
| 3,722,969 | 3/1973 | Eklund | 384/492 |
| 4,253,714 | 3/1981 | Bhusham | 29/148.4 L |
| 4,387,938 | 6/1983 | Brandenstein et al. | 384/492 X |

FOREIGN PATENT DOCUMENTS 2336947  2/1975  Fed. Rep. of Germany ..... 29/148.4 R

OTHER PUBLICATIONS

Derwent Abstracts, No. 14537w, an abstract relating to Fed. Rep. of Germany Offenlegungsschrift, 2,336,947, published Feb. 20, 1975.

Primary Examiner—Howard N. Goldberg
Assistant Examiner—Ronald S. Wallace
Attorney, Agent, or Firm—Eugene E. Renz, Jr.

[57] ABSTRACT

In a rolling bearing assembly including at least two contact metal surfaces, such as a rolling bearing engaging a housing and a shaft, a homogeneous elastic layer is fixedly applied to one of said contacting surfaces, the outer surface of this layer having high density and extreme smoothness for full intimate contact with the contacting metal surface to avoid fretting corrosion between said contacting metal surfaces.

4 Claims, 2 Drawing Figures

METHOD OF CONSTRUCTING AN ASSEMBLY WITH A ROLLER BEARING TO AVOID FRETTING CORROSION

BACKGROUND OF THE INVENTION

The invention relates to a method of constructing an assembly of at least two metal parts such as a rolling bearing with a housing or shaft in mating or fitting contact with each other and with minimal movement relative to each other under an alternating load, in such manner to avoid fretting corrosion at the surfaces in contact.

Fretting corrosion is defined as a phenomenon of wear that occurs between two surfaces subjected to a relative vibratory motion of comparatively small amplitude. In a rolling bearing assembly such motions occur between the inner ring and the shaft and between the outer ring and the housing because of the alternating stresses in the faces as the rolling elements pass along them with resulting elastic deformations in the rings.

Heretofore, to avoid fretting corrosion close press fits have been employed in order to reduce elastic deformations. In the first place, this cannot completely prevent the occurrence of fretting corrosion under high dynamic stresses in a rolling bearing assembly, and in the second place a press fit is not always available. When installing a rolling bearing in the axle box or housing of a bearing in railroad rolling stock, for example, or in a doubly supported shaft where one loose bearing is used to compensate play in the shaft, a press fit would present formidable problems.

The object of the invention is to improve known methods of minimizing fretting corrosion in such manner that in the resulting assembly no fretting corrosion will occur even under extremely high dynamic stresses, and no press fit is required.

SUMMARY OF THE INVENTION

The above-noted object is accomplished, in the method according to the invention, in that a layer of homogeneous elastic material is applied and affixed to one of the contacting surfaces; the other surface of the said layer is of high density and is extremely smooth, so that it comes into full intimate contact with the other contact surface with so high a coefficient of friction that no relative sliding oscillatory movements between these two surfaces can take place.

Preferably, the layer consists of a synthetic material sintered to the surface; a highly satisfactory synthetic material is polyamide 11. It is noted that a very high density may be achieved by sintering.

In this way the elastic deformations set up in the ring by the dynamic loads in the assembly are absorbed by the layer of homogeneous elastic material, so that no relative sliding oscillatory movements can occur. It is here of especially great importance that the surface of the layer be of high density and be extremely smooth, since otherwise relative sliding motion could nevertheless occur between that surface and the metal surface in contact with it which would result in fretting corrosion, as will be more fully explained with reference to the drawing. It should be noted that the required density and smoothness of the metal surface can be obtained by means of fine grinding operations.

DETAILED DESCRIPTION OF THE PREFERRED EMBODIMENT

Figure 1:
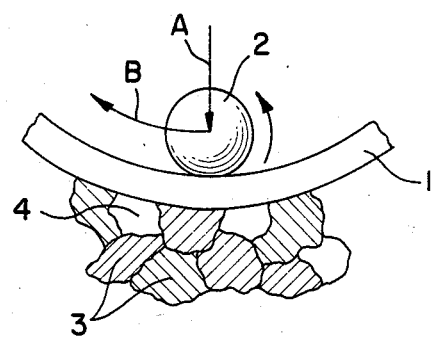
FIG. 1 is a fragmentary elevation view of a prior-art ball bearing assembly.
Figure 2:
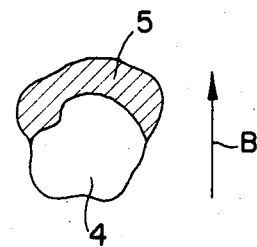
FIG. 2 is a top view of the surface of the elastic layer in contact with the ring from FIG. 1.

FIG. 1 shows a portion of an outer ring 1 and only one rolling element 2 of a rolling bearing. Between this outer ring and a housing not shown is a layer 3 of a homogeneous elastic material of granular structure; however, granules are missing in the surface of this layer leaving open cavities 4. Owing to the rolling bearing load indicated by the arrow A and the rolling elements traveling in direction B, alternating stresses on the ring 1 arise, so that this ring suffers elastic deformations which, at the edges of the open cavities give rise to relative sliding movements, so that fretting corrosion occurs. This is especially evident at that edge of a cavity 4 which, in direction B, represents the leading edge, as indicated by the portion 5 in FIG. 2, showing a top view of the surface of layer 4 in contact with ring 1.

According to West German Offenlegunsschrift No. 2,336,947, a method is proposed to protect a metal part against corrosion, and in particular to aviod fretting corrosion, wherein, on at least a portion of the surface of the metal part a layer of material is applied and connected to that part by friction which generates a positive contact potential.

Here, in other words, some relative motion between metal surface and the layer of material must be permitted, so that friction will generate a positive surface charge on the layer of material and a negative surface charge on the metal part, which negative potential prevents occurrence of reactions of anions with the metal. In essence, therefore, fretting corrosion is not avoided; instead this arrangement reduces chemical corrosion which is the consequence of an aqueous electrolyte film present in the fit and formed for example by condensation. Such layer of material consists preferably of a glass fiber mat imbedded in a synthetic material. Thus, this known prior art layer does not consist of a homogeneous elastic material. Furthermore, because the glass fibers project through this surface, such surface does not have the high density and smoothness as disclosed above in connection with the present invention.

What is claimed is:

1. In a method for constructing a bearing assembly having at least two metal elements in rolling contact, the surfaces of said metal elements normally having open cavities therein which tend to cause relative sliding movement between said metal elements during use thus causing fretting erosion between said metal elements; the improvement which comprises:
    fixedly adhering a layer of a homogeneous elastic material to the surface of at least one of said elements in rolling contact with the other metal element;
    said layer of homogeneous elastic material having density and smoothness such that it contains fewer and smaller open cavities than the surface of the metal element to which it is adhered;
    whereby said reduction in the number and size of open cavities in the layer of elastic material increases the coefficient of friction between the surfaces in rolling contact due to full intimate contact therebetween, thus substantially eliminating relative sliding movement between said elements in rolling contact with substantial elimination of fretting erosion of the surfaces thereof.

2. A method according to claim 1, wherein fixedly applying said layer comprises sintering.

3. A method according to claim 2, wherein said layer comprises a synthetic material.

4. A method according to claim 3, wherein said synthetic material comprises polyamide 11.

* * * * *